United States Patent [19]
Jones

[11] 3,752,531
[45] Aug. 14, 1973

[54] MOBILE GRANDSTAND

[76] Inventor: Robert Idris Jones, Kings Leap Castle St., Winchelsea, England

[22] Filed: Dec. 30, 1970

[21] Appl. No.: 102,867

[52] U.S. Cl. .................................. 296/64, 52/8
[51] Int. Cl. .................................. B60n 1/00
[58] Field of Search ............... 296/1 R, 64; 52/8, 52/9, 10; 297/232

[56] References Cited
UNITED STATES PATENTS

| | | | |
|---|---|---|---|
| 3,469,355 | 9/1969 | McGann | 296/64 |
| 3,070,849 | 1/1963 | Irwin | 52/8 X |
| 2,587,159 | 2/1952 | Holmes | 52/9 |
| 2,635,889 | 4/1953 | Concello | 296/1 R X |

FOREIGN PATENTS OR APPLICATIONS

| | | | |
|---|---|---|---|
| 702,919 | 4/1966 | Italy | 52/9 |
| 709,557 | 6/1966 | Italy | 52/9 |

Primary Examiner—Benjamin Hersh
Assistant Examiner—John A. Pekar
Attorney—Watson, Cole, Grindle & Watson

[57] ABSTRACT

A vehicle for use as a mobile grandstand, having two seating members connected to a wheeled chassis, in which the seating members each comprise a plurality of rows of seats arranged with one row behind and above another row, and the seating members may be disposed either in a travelling position, in which they are positioned one above the other, and a seating position in which the seats are so disposed that they form in effect a single tier.

4 Claims, 1 Drawing Figure

PATENTED AUG 14 1973
3,752,531
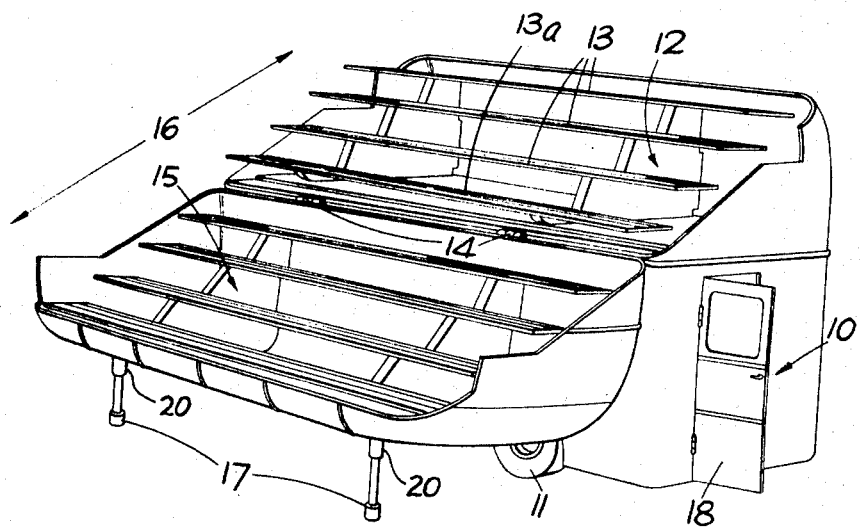
Inventor
Robert Idris Jones
By: Watson, Cole, Grindle & Watson
Attorneys

MOBILE GRANDSTAND

BACKGROUND OF THE INVENTION

The invention relates to a vehicle for use as a mobile grandstand.

It has been known for grandstands to be erected of scaffolding for events which are held only seldom at selected venues. For instance scaffolding grandstands have been used for ceremonial occasions such as coronations, and for sporting events such as motor racing meetings, which events take place at infrequent intervals on locations that may not be appropriate for permanent grandstand facilities.

The disadvantages of such scaffolding built grandstands include the problems of storage, transport, erection, finishing, and disassembly. Due to the peculier requirements of each event standardisation is difficult, and the operations to be carried out in the supply of a grandstand will of necessity be labour intensive.

SUMMARY OF THE INVENTION

The invention provides a mobile grandstand having at least one tier of seats comprising a plurality of rows of seats arranged with one row behind and above another row, and with the rows of seats arranged parallel to the normal direction of travel.

The invention also provides a vehicle having a frame and two seating tier members each comprising a plurality of rows of seats arranged with one row behind and above another row, and attached to the frame in such a way that they are movable between a travelling position, in which they are one at a higher level than the other, and a seating position, in which the two tiers are arranged side by side with one tier lower than the other to form in effect a single tier.

According to a feature of the invention said other seating tier member forms the lower part of the single tier aforesaid.

According to another feature of the invention the frame has legs upon which the vehicle can be supported.

Preferably the legs are operable by hydraulic or mechanical means, the arrangement being such that the vehicle is automatically levelled and stabilized when it is supported by the legs.

It is further preferred that there is means to adjust individually the position of the legs with respect to the frame.

The lower part of the vehicle may incorporate such domestic facilities as sleeping accommodation, cooking accommodation, eating and drinking facilities, dressing rooms, conveniences, office accommodation, banking facilities, or a display room.

In one form a first seating member is attached directly to the frame, and a second seating tier member is attached to the frame by hinge means which may be a conventional hinge or a system of articulated links.

More specifically the vehicle comprises a frame which has wheels to support the vehicle, a lower seating member fixed to the frame and a tier of seats on that lower seating member, and an upper seating member hingedly attached to the lower seating member at the same side thereof as the lower edge of the tier of seats on that lower seating member, which upper seating member has itself a tier of seats of which the upper edge is adjacent the hinge line, in which vehicle the upper seating member forms in one position a roof for the vehicle, and in another position a continuation tier of seats extending downwardly from the tier of seats on the lower seating member.

The invention includes a toy or model vehicle constructed in accordance with the description set out above.

BRIEF DESCRIPTION OF THE DRAWING

The specific embodiment of the invention will now be described by way of example with reference to the accompanying drawing which is a perspective view taken from the rear and one side of a vehicle which in its mobile form would look like a double-decker London Transport bus.

DESCRIPTION OF THE PREFERRED EMBODIMENT

A vehicle 10, has a rectangular chassis, and four wheels (or more) attached to the chassis near to the four corners thereof. One of the rear wheels of the vehicle is shown with the reference numeral 11. The chassis has four arms near to its four corners, and these arms have downwardly extending legs dependent therefrom. The arms are arranged to swing outwardly from the chassis when the vehicle is at a standstill, and the legs incorporate hydraulic or mechanical jacks which can be used to stabilise and level the vehicle. The jacks may be linked together in a hydraulic circuit to distribute the weight of the vehicle appropriately between the four legs.

Mounted on the chassis there is a lower seating member 12, which has a seating tier comprising several set rows of seats 13, facing towards one of the longer sides of the vehicle.

The lower seating member has hinges 14 along its edge running parallel to and in front of the lowest row of seats (13a). The hinges are arranged along said one longer side, and just above a height midway between the ground and a roof of the vehicle. An upper seating member 15 is attached to the hinge. The upper seating member has a tier of seats, and may be disposed either in a position to form a roof for the vehicle (i.e. in a travelling position), or in a position alongside the lower seating member (i.e. the seating position) as shown. There may be hydraulic or mechanical means of moving the upper seating member between its two positions.

The seats on the lower seating member are raised sufficiently from the ground to permit the upper seating member to be rotated from the position in which it forms a roof, to its seating position in which it forms a single tier in combination with the seats on the lower seating member.

In its configuration forming a lower part of the single tier 16, the upper seating member could be supported at its edge adjacent the ground (e.g. by jacks 20 on legs 17) remote from the chassis of the vehicle, so that any tendency for the vehicle to tip over could be resisted.

The lower seating member, which forms the upper part of the single tier 16, carries control apparatus for the vehicle, which control apparatus includes a driving position from which the movement of the vehicle could be directed. The control apparatus also includes means for operating the jacks which stabilise the level of the vehicle, and also the jacks which move the upper seating portion between its travelling position and its seating position. The control may be reached by a private door 18 in the rear of the vehicle.

The lower seating member may also carry ancillary services which may be desirable adjoints to the movable grandstand which is constituted by the vehicle when the seating members are in a seated position. These services may include catering facilities and public conveniences, and there may be sleeping accommodation for the driver and or operator of the vehicle. Office accommodation, banking and display facilities are also within the convention. Such facilities may be reached by a door in the offside of the vehicle, not shown in the drawing.

It will be appreciated that the invention relates to vehicles which may or may not be motorised. It is for instance possible to have one motorised vehicle towing one or more unmotorised ones, which can all be assembled together to form a large grandstand.

It is to be understood that toys and models are within the scope of the invention.

We claim:

1. A mobile grandstand including a wheeled vehicular frame having a given direction of travel; two seating tier members, each comprising a plurality of rows of seats arranged with one row behind and above another row, one of said seating tier members being connected to the frame, and the other of said seating tier members having roofing material on its side opposite said rows of seats and being hingedly connected to said one seating tier member by a hinge arrangement, the axis of which lies parallel to said given direction and adjacent the lower edge of the one seating tier member, whereby the other seating tier member may be moved between a travelling configuration in which it is directly above the one seating tier member, and constitutes a roof therefor, and a seating configuration in which said two seating tier members are arranged to form effectively a single bank of seats with the other seating tier member beside and below said one seating tier member.

2. A mobile grandstand as claimed in claim 1 in which said other seating tier member has legs to support at least a part of its weight when it is in the seating configuration.

3. A mobile grandstand as claimed in claim 2 in which there is means to individually adjust the positions of said legs with respect to said frame.

4. A mobile grandstand having in combination:
 a. a wheeled vehicular frame having a given direction of travel,
 b. a first seating tier member comprising a plurality of rows of seats arranged with one row behind and above another row,
 c. a second seating tier member comprising a plurality of rows of seats arranged with one row behind and above another row, said second seating tier member being fixedly secured to said frame and said first seating tier member lying directly above said second seating tier member in a travelling position of the grandstand in which position it forms a roof therefor, said seating tier members being hingedly connected together, said hinged connection lying parallel to the given direction of travel and adjacent the lower edge of the first seating tier member, whereby said first seating tier member can be rotated about said hinged connection from travelling position directly above said second seating tier member to a seating position below and beside said second seating tier member,
 d. two legs on the first seating tier member, and disposed partially to support said first seating tier member when it is in its seating position,
 e. hydraulic means to adjust the positions of said legs with respect to said frame, whereby to level the grandstand, and
 f. domestic facilities on said frame and below said second seating tier member.

* * * * *